(12) United States Patent
Mochizuki et al.

(10) Patent No.: US 12,521,090 B2
(45) Date of Patent: Jan. 13, 2026

(54) CONTACT-SURFACE DETERMINATION APPARATUS, ULTRASONIC DIAGNOSTIC APPARATUS, AND ULTRASONIC DIAGNOSTIC SYSTEM

(71) Applicant: CANON MEDICAL SYSTEMS CORPORATION, Otawara (JP)

(72) Inventors: Fumio Mochizuki, Utsunomiya (JP); Minori Ohashi, Otawara (JP); Ayako Suzuki, Nasushiobara (JP); Koichiro Kurita, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 136 days.

(21) Appl. No.: 18/479,138

(22) Filed: Oct. 2, 2023

(65) Prior Publication Data

US 2024/0115236 A1 Apr. 11, 2024

(30) Foreign Application Priority Data

Oct. 5, 2022 (JP) .................................. 2022-160780

(51) Int. Cl.
  *A61B 8/00* (2006.01)
(52) U.S. Cl.
  CPC .......... *A61B 8/4245* (2013.01); *A61B 8/4444* (2013.01); *A61B 8/4494* (2013.01); *A61B 8/463* (2013.01); *A61B 8/58* (2013.01)

(58) Field of Classification Search
  CPC ... A61B 8/4245; A61B 8/4444; A61B 8/4494; A61B 8/463; A61B 8/58
  See application file for complete search history.

(56) References Cited

U.S. PATENT DOCUMENTS

| | | |
|---|---|---|
| 2006/0052703 A1 | 3/2006 | Kumazawa |
| 2011/0265570 A1 | 11/2011 | Kumazawa |
| 2011/0265571 A1 | 11/2011 | Kumazawa |
| 2011/0271762 A1 | 11/2011 | Kumazawa |
| 2011/0271763 A1 | 11/2011 | Kumazawa |
| 2011/0275937 A1 | 11/2011 | Kumazawa |
| 2013/0296707 A1* | 11/2013 | Anthony ............... A61B 8/4254 600/459 |
| 2024/0099688 A1* | 3/2024 | Noguchi .................. A61B 8/06 |

FOREIGN PATENT DOCUMENTS

JP 2006-95292 A 4/2006

* cited by examiner

*Primary Examiner* — Joel Lamprecht
*Assistant Examiner* — Adam D. Kolkin
(74) *Attorney, Agent, or Firm* — Oblon, McClelland, Maier & Neustadt, L.L.P.

(57) ABSTRACT

In one embodiment, a contact-surface determination apparatus includes processing circuitry. This processing circuitry acquires an image depicting a contact surface of a ultrasonic probe, and determines a state of the contact surface of the ultrasonic probe on the basis of the acquired image.

9 Claims, 10 Drawing Sheets

CONTACT-SURFACE DETERMINATION APPARATUS, ULTRASONIC DIAGNOSTIC APPARATUS, AND ULTRASONIC DIAGNOSTIC SYSTEM

CROSS-REFERENCE TO RELATED APPLICATION

This application is based upon and claims the benefit of priority from Japanese Patent Application No. 2022-160780, filed on Oct. 5, 2022, the entire contents of which are incorporated herein by reference.

TECHNICAL FIELD

Disclosed embodiments relate to a contact-surface determination apparatus, an ultrasonic diagnostic apparatus, and an ultrasonic diagnostic system.

BACKGROUND

An ultrasonic diagnostic apparatus is provided with a probe-element check function for determining a state of each transducer of its ultrasonic probe. The probe-element check function determines the state of each transducer by: transmitting an ultrasonic pulse from the main body of the ultrasonic diagnostic apparatus to each transducer of the ultrasonic probe; and analyzing amplitude of the reflected wave received from each transducer, for example.

The probe-element check function is based on the premise that the ultrasonic probe is left in the air, i.e., the surface of the ultrasonic probe (i.e., the contact surface to be brought into contact with an object) is in contact with the air. In other words, for example, if echo jelly adheres to the surface of the ultrasonic probe, the aspect of the reflected wave from the transducer (for example, the amplitude and/or phase of the reflected wave) changes, and thus, the state of the transducer cannot be accurately determined. Hence, in order to accurately determine the state of each transducer, a service engineer has to manage the execution conditions of the probe-element check function, and such management cannot be entrusted to a user who performs examination of a patient using the ultrasonic diagnostic apparatus.

Although JP 2006-095292 A (hereinafter referred to as Patent Document 1) discloses a technique for prompting a maintenance worker to specify whether the appearance state of the ultrasonic probe of the ultrasonic diagnostic apparatus is satisfactory, there is a problem that the state of the contact surface of the ultrasonic probe cannot be determined automatically.

DETAILED DESCRIPTION

Hereinbelow, a description will be given of respective embodiments of a contact-surface determination apparatus, an ultrasonic diagnostic apparatus, and an ultrasonic diagnostic system in detail by referring to the accompanying drawings.

In one embodiment, a contact-surface determination apparatus includes processing circuitry. This processing circuitry acquires an image depicting a contact surface of an ultrasonic probe, and determines a state of the contact surface of the ultrasonic probe on the basis of the acquired image.

First Embodiment

Figure 1:
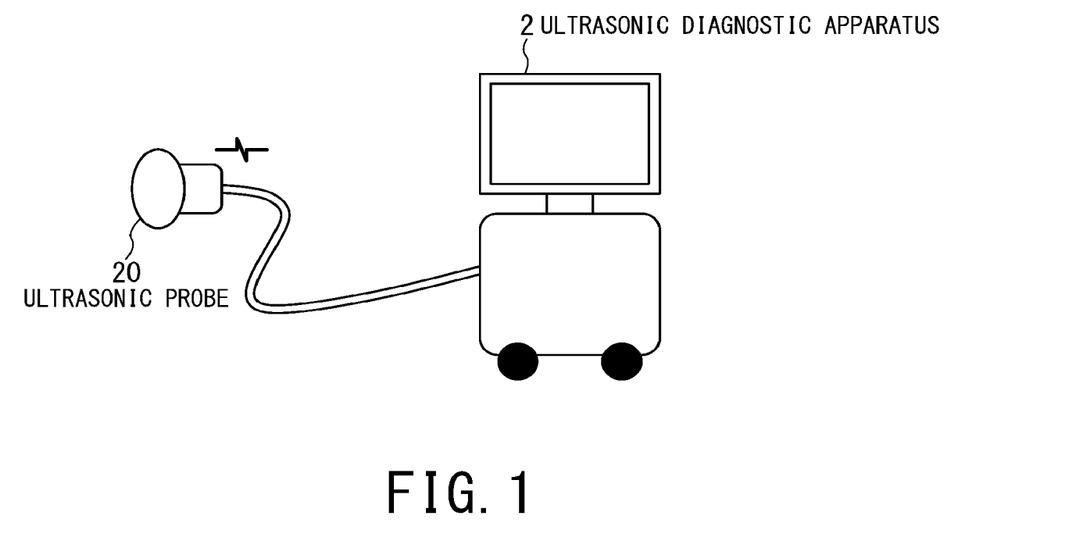
FIG. 1 is a schematic diagram of an ultrasonic diagnostic apparatus and an ultrasonic probe according to the first embodiment.
Figure 2:
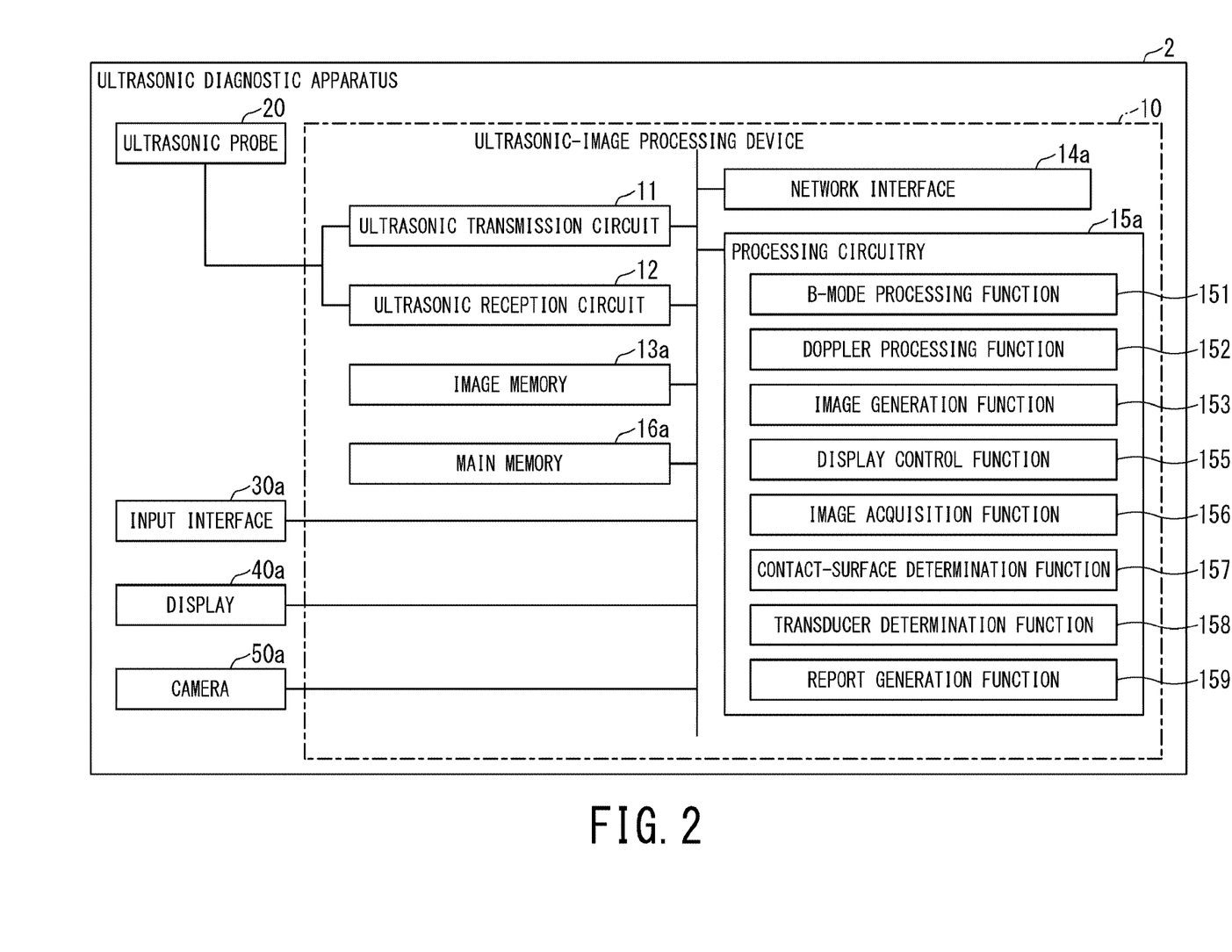
FIG. 2 is a block diagram illustrating a configuration of the ultrasonic diagnostic apparatus according to the first embodiment.

The first embodiment relates to an ultrasonic diagnostic apparatus 2 that determines the state of the contact surface of its ultrasonic probe 20. FIG. 1 is a schematic diagram of the ultrasonic diagnostic apparatus 2 and the ultrasonic probe 20 according to the first embodiment. FIG. 2 is a block diagram illustrating a configuration of the ultrasonic diagnostic apparatus 2 provided with an ultrasonic-image processing device 10 according to the first embodiment.

The ultrasonic diagnostic apparatus 2 includes: the ultrasonic-image processing device 10; the ultrasonic probe 20; an input interface 30a; a display 40a; and a camera 50a. The ultrasonic-image processing device 10 may include at least one of the ultrasonic probe 20, the input interface 30a, the display 40a, and the camera 50a. In the following, a description will be given of the case where all of the ultrasonic probe 20, the input interface 30a, the display 40a, and the camera 50a are provided outside the ultrasonic-image processing device 10.

The input interface 30a includes: an input device that can be operated by a user; and an input circuit to which signals from the input device are inputted. The input device is achieved by: a track ball; a switch; a mouse; a keyboard; a touch pad by which an input operation is performed by touching its operation screen; a touch screen in which the display screen and the touch pad are integrated; a non-contact input device using an optical sensor; and/or a voice input circuit, for example. When the input device receives an input operation from a user, the input circuit generates an electric signal based on the input operation and outputs the electric signal to processing circuitry 15a described below.

The display 40a is composed of a general display output device such as a liquid crystal display and an OLED (Organic Light Emitting Diode) display, for example. The display 40a displays various information items under the control of the processing circuitry 15a.

The camera 50a uses a semiconductor sensor, such as a CCD (Charge Coupled Device) and a CMOS (Complementary Metal Oxide Semiconductor) configured to store electric charge corresponding to amount of received light in each pixel, as an imaging sensor. The field of view of the camera 50a is directed toward the contact surface of the ultrasonic probe 20, and the camera 50a images the contact surface so as to generate its optical image under the control of an image acquisition function 156 described below. The camera 50a is, for example, a USB (Universal Serial Bus) camera.

The ultrasonic-image processing device 10 includes: an ultrasonic transmission circuit 11; an ultrasonic reception circuit 12; an image memory 13a; a network interface 14a; the processing circuitry 15a; and a main memory 16a. The ultrasonic transmission circuit 11 and the ultrasonic reception circuit 12 are composed of, for example, an application specific integrated circuit (ASIC). However, these circuits 11 and 12 are not limited to such an aspect, and all or some of the functions of these circuits 11 and 12 may be achieved by causing the processing circuitry 15a to execute computer-programs.

Under the control of the processing circuitry 15a, the ultrasonic transmission circuit 11 and the ultrasonic reception circuit 12 control the transmission directivity and the reception directivity in transmission and reception of ultrasonic waves. Although a description will be given of a case where both the ultrasonic transmission circuit 11 and the ultrasonic reception circuit 12 are provided in the ultrasonic-image processing device 10, at least one of the ultrasonic transmission circuit 11 and the ultrasonic reception circuit 12 may be provided in the ultrasonic probe 20 or may be provided in both the ultrasonic-image processing device 10 and the ultrasonic probe 20.

The ultrasonic transmission circuit 11 has a function of instantaneously changing parameters such as a transmission frequency and a transmission drive voltage in order to execute a predetermined scan sequence on the basis of an instruction from the processing circuitry 15a. In particular, the function of changing the transmission drive voltage is achieved by: a linear amplifier type transmission circuit that can instantaneously switch its value; or a mechanism configured to electrically switch between a plurality of power supply units, for example.

When a 3D scan, i.e., volume scan is performed, a 2D array probe capable of executing a scanning method such as a linear scan, a convex scan, and a sector scan is used as the ultrasonic probe 20. Additionally or alternatively, when a volume scan is performed, a 1D probe capable of executing a scanning method, such as a linear scan and a convex scan, and provided with a mechanism mechanically swinging in the elevation direction is used as the ultrasonic probe 20. The latter probe is also called a mechanical 4D probe.

The image memory 13a has a magnetic or optical recording medium or a processor-readable recording medium such as a semiconductor memory, for example. The image memory 13a stores a plurality of ultrasonic images under the control of the processing circuitry 15a.

The network interface 14a implements various information communication protocols in accordance with the form of the network. The network interface 14a may also implement various protocols for contactless wireless communication.

The processing circuitry 15a is configured as, for example, a special-purpose or general-purpose CPU (Central Processing Unit), an MPU (Micro Processor Unit), a GPU (Graphics Processing Unit), an ASIC, and/or a programmable logic device. The processing circuitry 15a is one example of second processing circuitry.

The main memory 16a is composed of a semiconductor memory element such as a RAM (Random Access Memory) and a flash memory, a hard disk, and/or an optical disk, for example. The main memory 16a may be composed of a portable medium such as a USB (Universal Serial bus) memory and a DVD (Digital Video Disk). The main memory 16a stores various processing programs (including, for example, application programs and an operating system) to be executed by the processing circuitry 15a and/or data necessary for executing the programs.

Next, the functions of the ultrasonic-image processing device 10 will be described by using FIG. 2.

The processing circuitry 15a executes the computer programs stored in the main memory 16a or an internal memory inside the processing circuitry 15a so as to implement: a B-mode processing function 151; a Doppler processing function 152; an image generation function 153; a display control function 155; an image acquisition function 156; a contact-surface determination function 157; a transducer determination function 158; and a report generation function 159. Although a description will be given of the case where the functions 151 to 153 and 155 to 159 are implemented by the computer programs, all or some of the functions 151 to 153 and 155 to 159 may be provided as functions of a circuit such as an ASIC in the ultrasonic-image processing device 10.

The B-mode processing function 151 controls the ultrasonic transmission circuit 11 and the ultrasonic reception circuit 12 so as to receive echo data from the ultrasonic reception circuit 12, and then performs processing such as logarithmic amplification and envelope detection on the echo data so as to generate two-dimensional or three-dimensional data in which signal intensity is represented by brightness or luminance. These data are referred to as the B-mode data, in general.

The Doppler processing function 152 is a function of generating data of Doppler information by: performing frequency analysis on the reception signal received from the ultrasonic reception circuit 12; and extracting motion information based on the Doppler effect of a moving object within a ROI (region of interest) having been set in the scan region. The generated Doppler information is stored in a RAW data memory (not shown) as Doppler RAW data (also referred to as the Doppler data) on two-dimensional ultrasonic scanning lines.

The image generation function 153 generates an ultrasonic image presented in a predetermined brightness range as image data on the basis of the echo signal received by the ultrasonic probe 20. For example, the image generation function 153 generates a B-mode image as an ultrasonic image, in which intensity of the reflected wave is represented by brightness on the basis of the two-dimensional B-mode data generated by the B-mode processing function 151. In addition, the image generation function 153 uses the two-dimensional Doppler data generated by the Doppler processing function 152 to generate a color Doppler image as an average velocity image, a dispersion image, a power image, or a combination of these images representing moving object information.

The display control function 155 includes a function of causing the display 40a to display an ultrasonic image. In addition, the display control function 155 includes a function of causing the display 40a to display an image depicting the contact surface of the ultrasonic probe 20.

The image acquisition function 156 includes a function of acquiring an image depicting the contact surface of ultrasonic probe 20 from the camera 50.

The contact-surface determination function 157 includes a function of determining the state of the contact surface of the ultrasonic probe 20 on the basis of the acquired image. The contact-surface determination function 157 determines whether a foreign substance adheres to the contact surface to be brought into contact with the object, the contact surface being on the ultrasonic probe 20, for example.

The transducer determination function 158 includes an element check function of determining the state of the transducers of the ultrasonic probe 20, when the state of the contact surface of the ultrasonic probe 20 is normal.

The report generation function 159 includes a function of generating a report showing the determination result of the contact surface.

Figure 3:
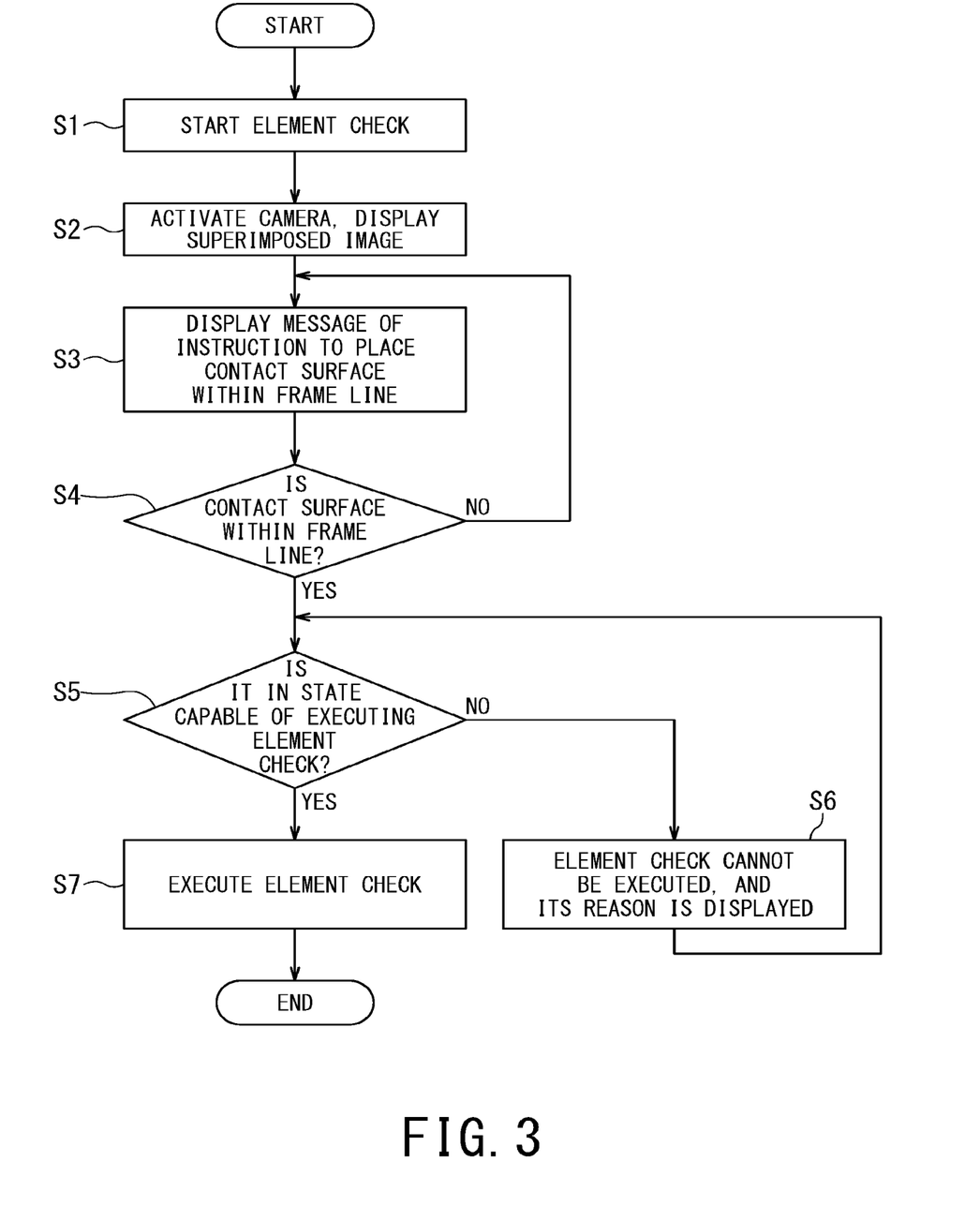
FIG. 3 is a flowchart illustrating processing to be executed by the ultrasonic diagnostic apparatus according to the first embodiment.

FIG. 3 is a flowchart illustrating the processing to be executed by the ultrasonic diagnostic apparatus 2 according to the first embodiment. This processing is element check processing on the premise that the camera 50a is connected to the ultrasonic-image processing device 10 provided as the main body of the ultrasonic diagnostic apparatus 2.

In the step S1, the processing circuitry 15a of the ultrasonic-image processing device 10 starts element check of the ultrasonic probe 20. This processing is triggered by the user performing a predetermined operation on the input interface 30a.

First, in the step S2, the processing circuitry 15a activates the camera 50a. At this time, the image acquisition function 156 acquires a superimposed image in which a frame line indicating a region for disposing the contact surface of the ultrasonic probe 20 is superimposed on the optical image generated by the activated camera 50a. Further, the display control function 155 causes the display 40a to display the acquired superimposed image.

In the next step S3, the display control function 155 causes the display 40a to display a message instructing the user to place the contact surface of the ultrasonic probe 20 within the frame line of the superimposed image. In other words, the display 40a displays both the frame line and the message of instruction. The region within the above-described frame line is one example of a predetermined imaging region of the camera. In addition, the above-described message is one example of guidance display for having the contact surface of the ultrasonic probe 20 placed within the predetermined imaging region.

Figure 4A:
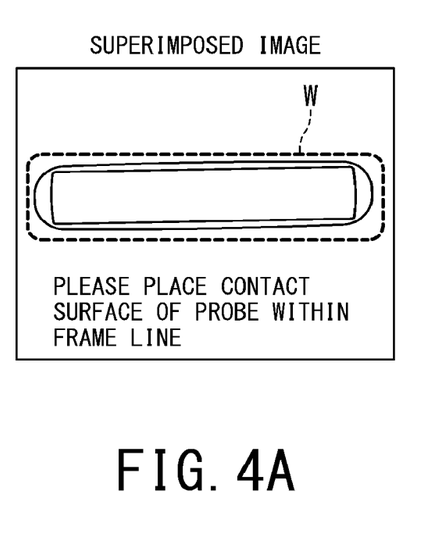
FIG. 4A is a schematic diagram illustrating an image generated by a camera according to the first embodiment.
Figure 4B:
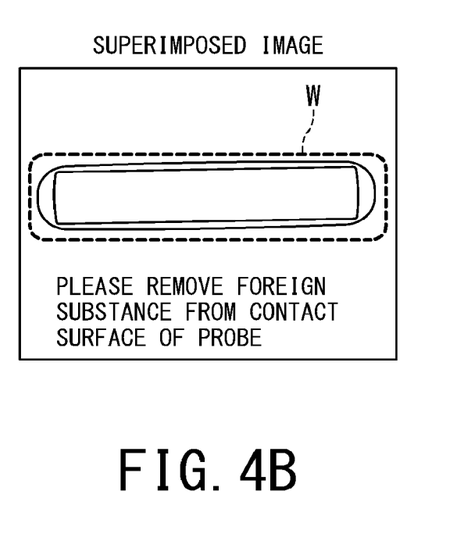
FIG. 4B is a schematic diagram illustrating another image generated by the camera according to the first embodiment.

Each of FIG. 4A and FIG. 4B is a schematic diagram illustrating an optical image generated by the camera 50a according to the first embodiment. For example, the display control function 155 may cause the display 40a to display the frame line W and the message indicating "Please place the contact surface of the probe within the frame line" as shown in FIG. 4A.

In response to the display of the message, the user is prompted to place the contact surface of the ultrasonic probe 20 within the frame line displayed on the display 40a by holding the ultrasonic probe 20 and adjusting the position and orientation of the ultrasonic probe 20.

In the step S4, on the basis of the superimposed image generated by using the camera 50a, the contact-surface determination function 157 determines whether the contact surface of the ultrasonic probe 20 is placed within the frame line. If the contact surface is within the frame line (YES in the step S4), the processing circuitry 15a advances the processing to the step S5. If the contact surface is not within the frame line (NO in the step S4), the processing circuitry 15a returns the processing to the step S3.

In the step S5 subsequent to the determination that the contact surface is within the frame line, on the basis of the superimposed image of the camera 50a, the contact-surface determination function 157 determines whether the contact surface is in the normal state where element check can be performed. The contact-surface determination function 157 uses pattern matching with normal cases and/or AI (such as deep learning) to determine whether a foreign substance such as echo jelly adheres to the contact surface, for example.

If the contact surface of the ultrasonic probe 20 is in the normal state where element check can be performed (YES in the step S5), the processing circuitry 15a advances the processing to the step S7. If it is in a state where the element check on the contact surface of the ultrasonic probe 20 cannot be performed (NO in the step S5), the processing circuitry 15a advances the processing to the step S6.

In the step S6 subsequent to the determination that the element check cannot be performed (i.e., the state of the contact surface of the ultrasonic probe 20 is not normal), the display control function 155 causes the display 40a to display information indicating that the element check cannot be executed (i.e., the state of the transducer cannot be determined) and its reason (the state of the contact surface). In other words, the display 40a displays information indicating that the element check cannot be executed and its reason. The display 40a shows the state of the contact surface of the ultrasonic probe 20, for example, through a message indicating that "the element check cannot be performed due to a foreign substance adhering to the contact surface" or "please remove the foreign substance from the contact surface". Afterward, the processing circuitry 15a returns the processing to the determination of the step S5.

In response to the display of the reason why the element check cannot be performed, it is conceivable that the user removes the foreign substance adhering to the contact surface of the ultrasonic probe 20 in order to solve the problem, for example. Accordingly, the determination result of the step S5 then becomes affirmative.

In the step S7 subsequent to the determination that the contact surface of the ultrasonic probe 20 is in the normal state capable of executing the element check, the processing circuitry 15a executes the element check. Afterward, the report generation function 159 generates a report indicating the result of the element check and stores the report in the main memory 16a.

The report includes an optical image depicting the surface and appearance of the transducer(s) of the ultrasonic probe 20 imaged by the camera 50a before execution of the element check, and this optical image is automatically inserted at a predetermined position in the report. The optical image to be automatically inserted into the report may be the image used for determining whether the element check can be executed or may be an arbitrary image that is generated by the camera 50a before execution of the element check and is desired to be inserted into the report by the user.

According to the first embodiment, the state of the ultrasonic probe 20 can be accurately determined, and thus, the element check of the ultrasonic probe 20, even entrusted to the user, can be performed without any problem. Further, conventionally the service engineer has to add a photograph of the transducer surface of the ultrasonic probe 20 after generating the report of the element check, but the camera image can be automatically added in the case of the present embodiment. As a result, a secondary effect of saving the trouble of completing or complementing the report can also be expected.

Second Embodiment

Figure 5:
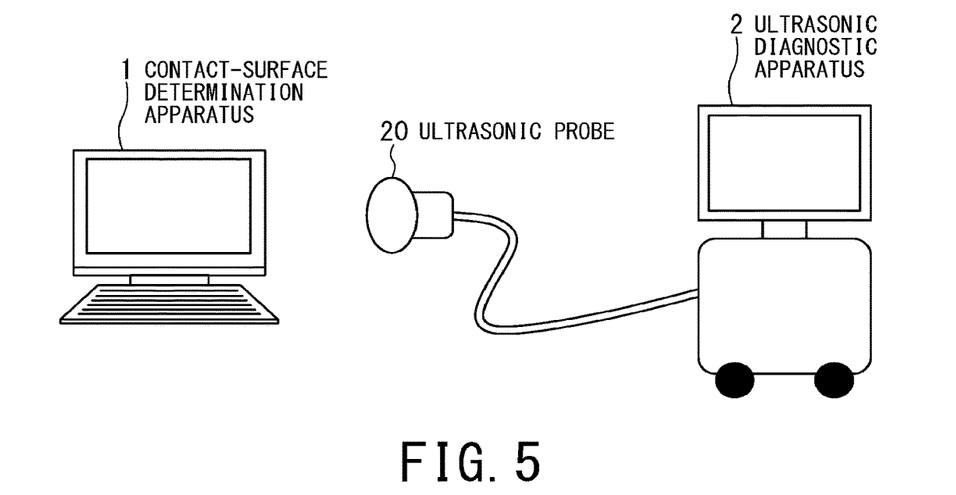
FIG. 5 is a schematic diagram illustrating a contact-surface determination apparatus, the ultrasonic diagnostic apparatus, and the ultrasonic probe according to the second embodiment.
Figure 6:
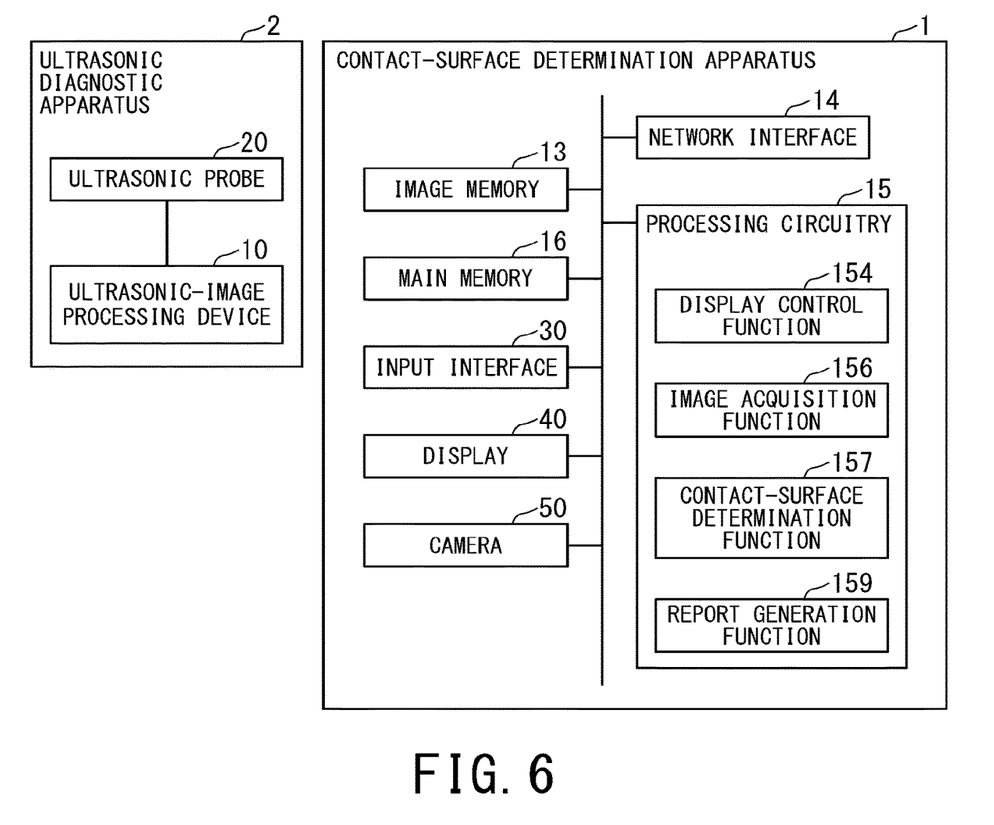
FIG. 6 is a block diagram illustrating a configuration of the contact-surface determination apparatus according to the second embodiment.

The second embodiment relates to a contact-surface determination apparatus 1 that determines the state of the contact surface of the ultrasonic probe 20. FIG. 5 is a schematic diagram illustrating the contact-surface determination apparatus 1, the ultrasonic diagnostic apparatus 2, and the ultrasonic probe 20 according to the second embodiment. FIG. 6 is a block diagram illustrating a configuration of the contact-surface determination apparatus 1 according to the second embodiment.

The contact-surface determination apparatus 1 is configured by, for example, a desktop PC (Personal Computer), a notebook PC (laptop PC), or a tablet PC (including a smartphone, a tablet, and a phablet). The contact-surface determination apparatus 1 includes: an image memory 13; a network interface 14; processing circuitry 15; a main memory 16; an input interface 30; a display 40; and a camera 50.

The image memory 13, the network interface 14, the processing circuitry 15, and the main memory 16 respectively function in a manner similar to the image memory 13a, the network interface 14a, the processing circuitry 15a, and the main memory 16a in FIG. 2, and duplicate description is omitted.

The processing circuitry 15 implements: the display control function 154; the image acquisition function 156; the contact-surface determination function 157; and the report generation function 159. The processing circuitry 15 is one example of first processing circuitry.

The display control function 154 includes a function of causing the display 40 to display an image, a frame line, a message, and a report, for example.

Since the image acquisition function 156, the contact-surface determination function 157, and the report generation function 159 have been described by using FIG. 2, duplicate description is omitted.

The input interface 30, the display 40, and the camera 50 respectively function in a manner similar to the input interface 30a, the display 40a, and the camera 50a in FIG. 2, and duplicate description is omitted.

Figure 7:
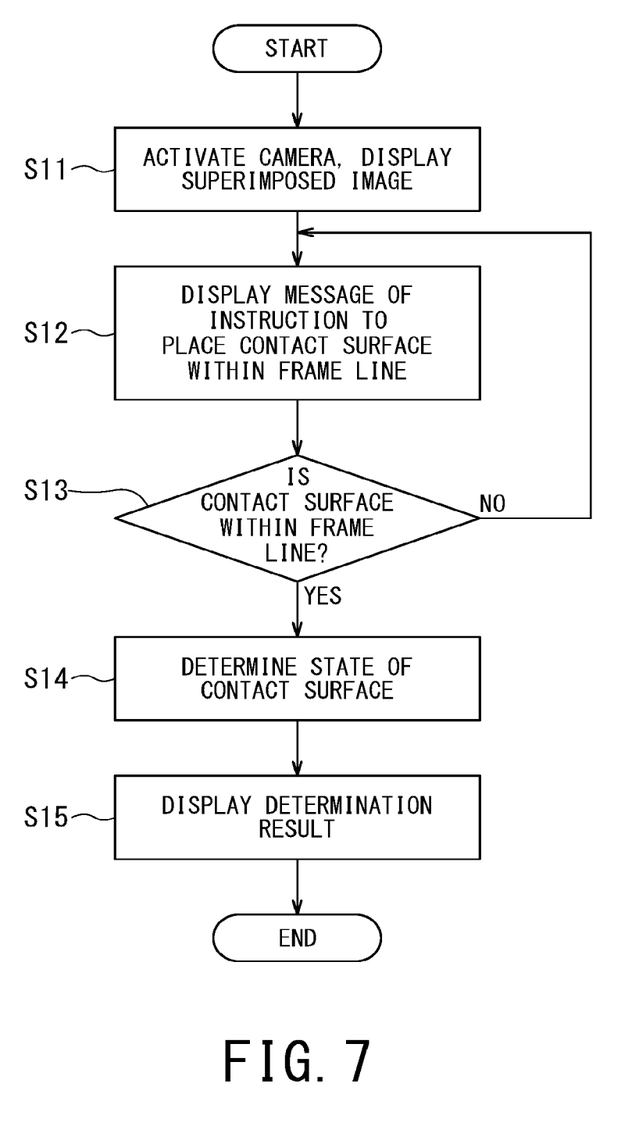
FIG. 7 is a flowchart illustrating processing to be executed by the contact-surface determination apparatus according to the second embodiment.

FIG. 7 is a flowchart illustrating the processing to be executed by the contact-surface determination apparatus 1 according to the second embodiment. In this processing, the contact-surface determination apparatus 1 determines the state of the contact surface of the ultrasonic probe 20 provided in the ultrasonic diagnostic apparatus 2.

First, in the step S11, the processing circuitry 15 of the contact-surface determination apparatus 1 activates the camera 50. At this time, the image acquisition function 156 acquires an optical image generated by the activated camera 50. Further, the display control function 154 causes the display 40 to display a superimposed image in which information indicating where to place the contact surface of the ultrasonic probe 20 (for example, the frame line W in FIG. 4A) is superimposed on the acquired optical image. The information to be superimposed is not limited to the frame line W and may be a straight line indicating the long axis direction of the contact surface or an ellipse which is long in the long axis direction of the contact surface, for example.

In the next step S12, the display control function 154 causes the display 40 to display a message instructing the user to place the contact surface of the ultrasonic probe 20 within the frame line in the superimposed image (for example, within the frame line W in FIG. 4A).

In response to the display of the message, the user is prompted to place the contact surface of the ultrasonic probe 20 within the frame line W displayed on the display 40 by holding the ultrasonic probe 20 and adjusting the position and orientation of the ultrasonic probe 20. Instead of or in addition to adjusting the position and orientation of the ultrasonic probe 20, the user may adjust the position and orientation of the camera 50.

In the step S13, on the basis of the optical image generated by using the camera 50, the contact-surface determination function 157 determines whether the contact surface of the ultrasonic probe 20 is placed within the frame line. If the contact surface is within the frame line (YES in the step S13), the processing circuitry 15 advances the processing to the step S14. If the contact surface is not within the frame line (NO in the step S13), the processing circuitry 15 returns the processing to the step S12.

In the step S14 subsequent to the determination that the contact surface is within the frame line, the contact-surface determination function 157 determines the state of the contact surface of the ultrasonic probe 20. The contact-surface determination function 157 uses an appropriate technique such as AI (e.g., deep learning) and pattern matching with normal cases for determining whether a foreign substance such as echo jelly adheres to the contact surface. For example, the contact-surface determination function 157 inputs a new contact surface image into a trained model having learned many contact surface images and determination results, so as to obtain a determination result corresponding to the new contact surface image. Since there are various ultrasonic probes 20 such as a linear type, a convex type, and a sector type and the shape of its contact surface also varies, it is preferred to generate a trained model for each shape of the contact surface of the ultrasonic probe 20 in advance.

The state of the contact surface is classified into: a normal state where nothing adheres to the contact surface and there is no problem such as a scratch on the contact surface; and an abnormal state where a foreign substance adheres to the contact surface or there is a problem with the contact surface itself. Among the abnormal states, a state where the contact surface itself has a problem is a state where the contact surface has, for example, peeling, loosening, discoloration, swelling, a gap, a recess, and/or a scratch.

In the step S15, the report generation function 159 generates a report showing the determination result of the state of the contact surface. Next, the display control function 154 causes the display 40 to display the generated report or a message indicating the gist of the report. The display control function 154 may cause the display 40 to display the frame line W and the message "Please remove the foreign substance from the contact surface of the probe", as shown in FIG. 4B, for example. The processing circuitry 15 stores the generated report in the main memory 16.

Although the state of the contact surface of the ultrasonic probe 20 being determined by placing the contact surface within the frame line superimposed on the optical image is described in the steps S13 and S14, the frame line may not necessarily be required. For example, if the contact surface of the ultrasonic probe 20 is depicted in the optical image generated by the camera 50, the contact-surface determination function 157 may automatically recognize the contact surface from the optical image and then determine the state of the contact surface. In this case, it is necessary to recognize the presence of the contact surface regardless of presence/absence of a foreign substance, and thus, an image processing technique such as pattern matching based on the contour of the contact surface may be used for recognizing or extracting the contact surface, for example.

Third Embodiment

Although the ultrasonic diagnostic apparatus 2 provided with the ultrasonic probe 20 performs both the contact-surface determination and the transducer determination in the above-described first embodiment, embodiments of the present invention are not limited to such a configuration. For example, an ultrasonic diagnostic apparatus and another apparatus (i.e., a contact-surface determination apparatus 1a described below) communicably connected to this ultrasonic diagnostic apparatus may share the processing of contact surface determination and the transducer determination. In other words, not only the camera connected to the ultrasonic diagnostic apparatus but also an external device provided outside the ultrasonic diagnostic apparatus (e.g., contact-surface determination apparatus 1a described below) may be used as the camera for imaging the ultrasonic probe. The third embodiment relates to an ultrasonic diagnostic system 100 that uses the user's contact-surface determination apparatus 1a as the camera.

Figure 8:
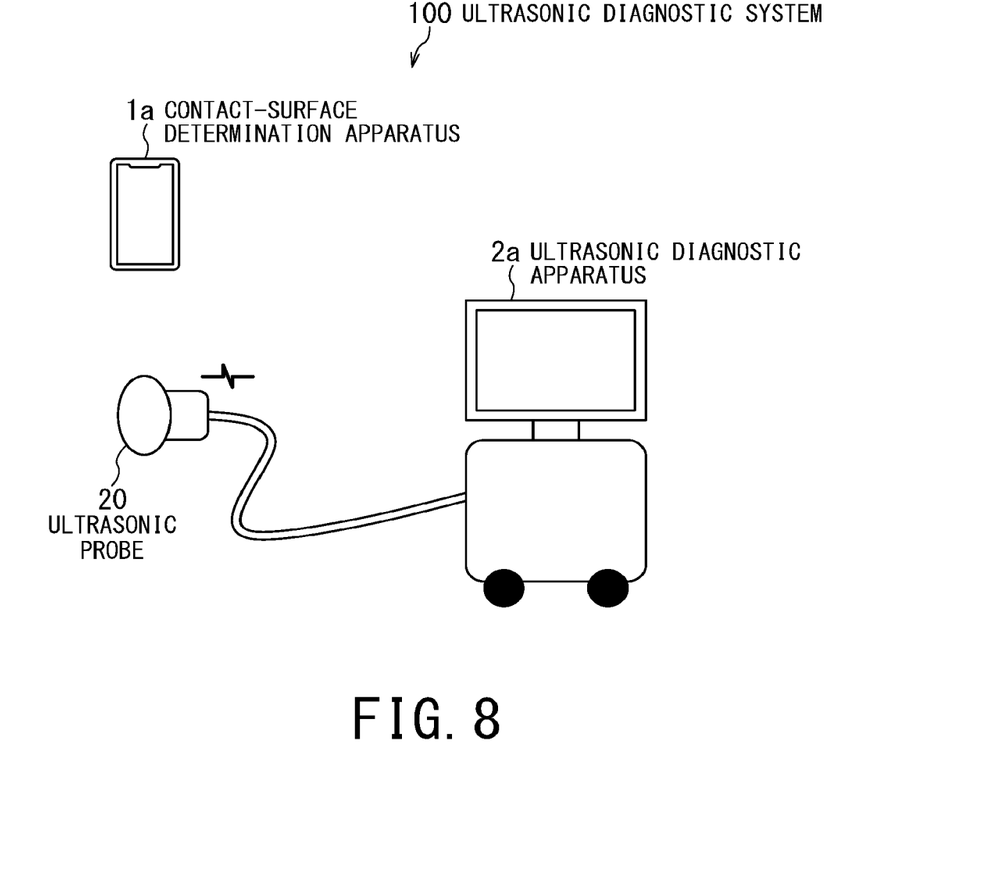
FIG. 8 is a schematic diagram illustrating an ultrasonic diagnostic system according to the third embodiment.
Figure 9:
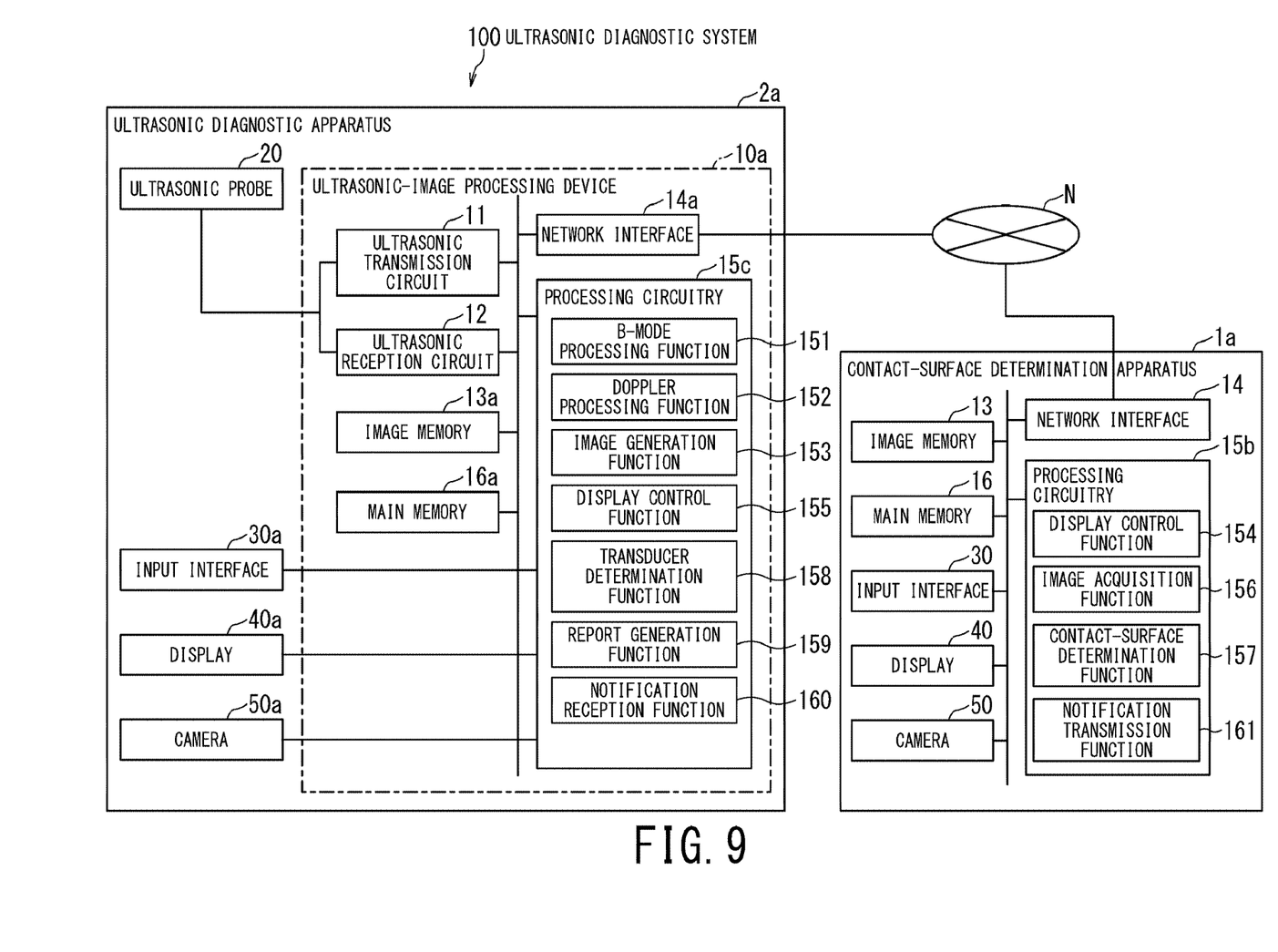
FIG. 9 is a block diagram illustrating a configuration of the ultrasonic diagnostic system according to the third embodiment.

FIG. 8 is a schematic diagram illustrating the ultrasonic diagnostic system 100 according to the third embodiment. FIG. 9 is a block diagram illustrating a configuration of the ultrasonic diagnostic system 100 according to the third embodiment. Although the configuration of the ultrasonic diagnostic system 100 will be described below, description of the same components as those in the first or second embodiment is omitted.

The ultrasonic diagnostic system 100 includes the contact-surface determination apparatus 1a and an ultrasonic diagnostic apparatus 2a.

The contact-surface determination apparatus 1a is communicably connected to the ultrasonic diagnostic apparatus 2a and includes: the image memory 13; the network interface 14; processing circuitry 15b; the main memory 16; the input interface 30; the display 40; and the camera 50. The processing circuitry 15b has: the display control function 154; the image acquisition function 156; the contact-surface determination function 157; and a notification transmission function 161. The notification transmission function 161 includes a function of wirelessly transmitting the state information of the contact surface of the ultrasonic probe 20 to the ultrasonic diagnostic apparatus 2a. The image memory 13, the network interface 14, the main memory 16, the input interface 30, the display 40, the camera 50, the display control function 154, the image acquisition function 156, and the contact-surface determination function 157 are the same as those in FIG. 6, and duplicate description is omitted.

Aside from the above-described functions, the contact-surface determination apparatus 1a has: a function of activating the camera 50; a function of superimposing and displaying a frame line and a message on an image generated by the camera 50; and a function of determining whether the contact surface of the ultrasonic probe 20 has been placed within the frame line of the superimposed image. Each of these functions is provided by application software installed into the contact-surface determination apparatus 1a.

The ultrasonic diagnostic apparatus 2a includes at least: the ultrasonic probe 20; a notification reception function 160; the transducer determination function 158; the display control function 155; and the report generation function 159. The notification reception function 160 includes a function of receiving the state information of the contact surface of the ultrasonic probe 20 from the contact-surface determination apparatus 1a. The transducer determination function 158 includes a function of determining the state of the transducers of the ultrasonic probe 20 when receiving the state of the contact surface of the ultrasonic probe from the contact-surface determination apparatus 1a. The display control function 155 includes a function of controlling the output of the determination result of the state of the transducers of the ultrasonic probe 20. The report generation function 159 includes a function of generating a report showing the result of the element check.

Figure 10:
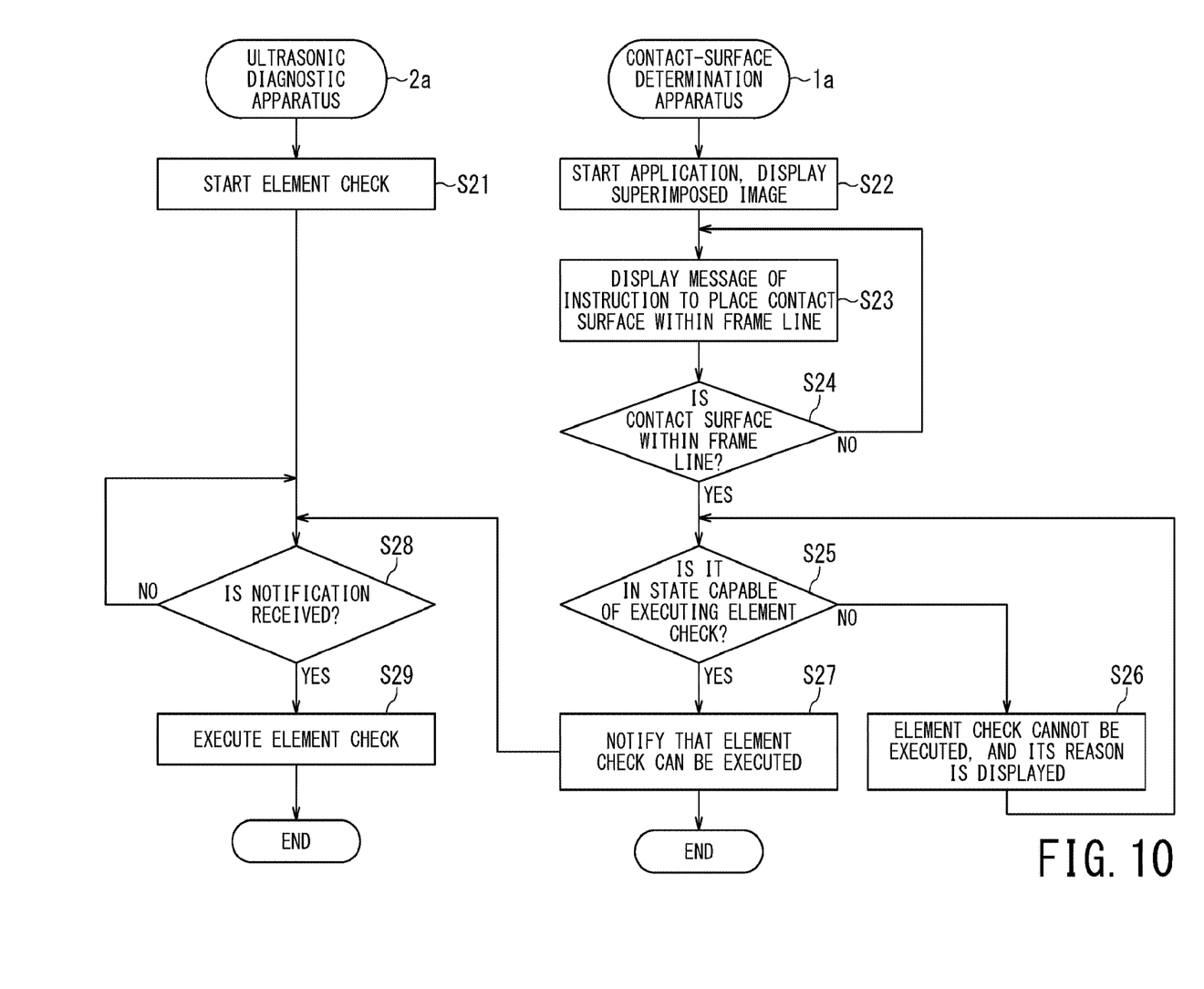
FIG. 10 is a flowchart illustrating processing to be executed by the ultrasonic diagnostic system according to the third embodiment.

FIG. 10 is a flowchart illustrating processing to be executed by the ultrasonic diagnostic system 100 according to the third embodiment. It is the element check processing to be co-executed by the contact-surface determination apparatus 1a and the ultrasonic diagnostic apparatus 2a in cooperation. The user performs predetermined operations on the ultrasonic-image processing device 10a and the contact-surface determination apparatus 1a in order to start the element check of the ultrasonic probe 20.

In the step S21, the processing circuitry 15c of the ultrasonic-image processing device 10a starts the element check of the ultrasonic probe 20. This processing is triggered by the user performing a predetermined operation on the input interface 30a. Afterward, the processing circuitry 15c performs the determination of the step S28. The details will be described below.

In the step S22, the contact-surface determination apparatus 1a starts an application. This processing is triggered by the user performing a predetermined operation on the contact-surface determination apparatus 1a. At this time, the camera 50 of the contact-surface determination apparatus 1a is activated, and the image acquisition function 156 acquires an optical image generated by the activated camera 50. Further, the display control function 154 causes the display 40 to display the acquired optical image.

In the step S23, the display control function 154 of the contact-surface determination apparatus 1a causes the display 40 to display a frame line and a message instructing the user to place the contact surface of the ultrasonic probe 20 within the frame line, in such a manner that the frame line and this message are superimposed on the previously displayed image.

In response to the display of the message, the user is prompted to place the contact surface of the ultrasonic probe 20 within the frame line displayed on the display 40 of the contact-surface determination apparatus 1a by holding and moving the ultrasonic probe 20 by hand.

In the step S24, based on the superimposed image generated by using the camera 50, the contact-surface determination function 157 of the contact-surface determination apparatus 1a determines whether the contact surface of the ultrasonic probe 20 is placed within the frame line. If the contact surface is within the frame line (YES in the step S24), the processing circuitry 15b advances the processing to the step S25. If the contact surface is not within the frame line (NO in the step S24), the processing circuitry 15b returns the processing to the step S23.

In the step S25 subsequent to the determination that the contact surface is within the frame line, the contact-surface determination function 157 of the contact-surface determination apparatus 1a determines whether the contact surface is in the normal state where the element check can be performed. The contact-surface determination function 157 uses pattern matching with normal cases and/or AI (such as deep learning) to determine whether a foreign substance such as echo jelly adheres to the contact surface, for example.

If the contact surface of the ultrasonic probe 20 is in the normal state where the element check can be performed (YES in the step S25), the processing circuitry 15b of the contact-surface determination apparatus 1a advances the processing to the step S27. If there is a problem with the contact surface of the ultrasonic probe 20 and the element check cannot be performed (NO in the step S25), the processing circuitry 15b advances the processing to the step S26.

In the step S26, the display control function 154 of the contact-surface determination apparatus 1a causes the display 40 to display information indicating that the element check cannot be performed and its reason. In other words, the display 40 displays information indicating that the element check cannot be performed and its reason. The display 40 shows the state of the contact surface of the ultrasonic probe 20, for example, by showing a message indicating that "the element check cannot be performed due to a foreign substance on the contact surface" or "please remove the foreign substance from the contact surface". Afterward, the contact-surface determination apparatus 1a returns the processing to the determination of the step S25.

In response to the display of the reason why the element check cannot be performed, it is conceivable that the user removes the foreign substance adhering to the contact surface of the ultrasonic probe 20 in order to solve the problem, for example. Accordingly, the determination result of the step S25 then becomes affirmative.

In the step S27 subsequent to the determination that the contact surface is in the normal state and the element check can be performed, the notification transmission function 161 of the contact-surface determination apparatus 1a wirelessly transmits a notification indicating that the element check can be performed to the ultrasonic diagnostic apparatus 2a. The wireless transmission of this notification may be performed via a network N such as the Internet shown in FIG. 9 or may be performed by using short-range communication such as Bluetooth.

In the step S28, the notification reception function 160 of the ultrasonic diagnostic apparatus 2a determines whether it has received a notification notifying that the element check can be performed. If the notification has been received (YES in the step S28), the processing circuitry 15c advances the processing to the step S29. If such a notification has not yet been received (NO in the step S28), the processing circuitry 15c repeats the determination of the step S28.

In the step S29, the processing circuitry 15c of the ultrasonic diagnostic apparatus 2a performs the element check. Afterward, the report generation function 159 generates a report indicating the result of the element check and stores the report in the main memory 16a.

Fourth Embodiment

Figure 11:
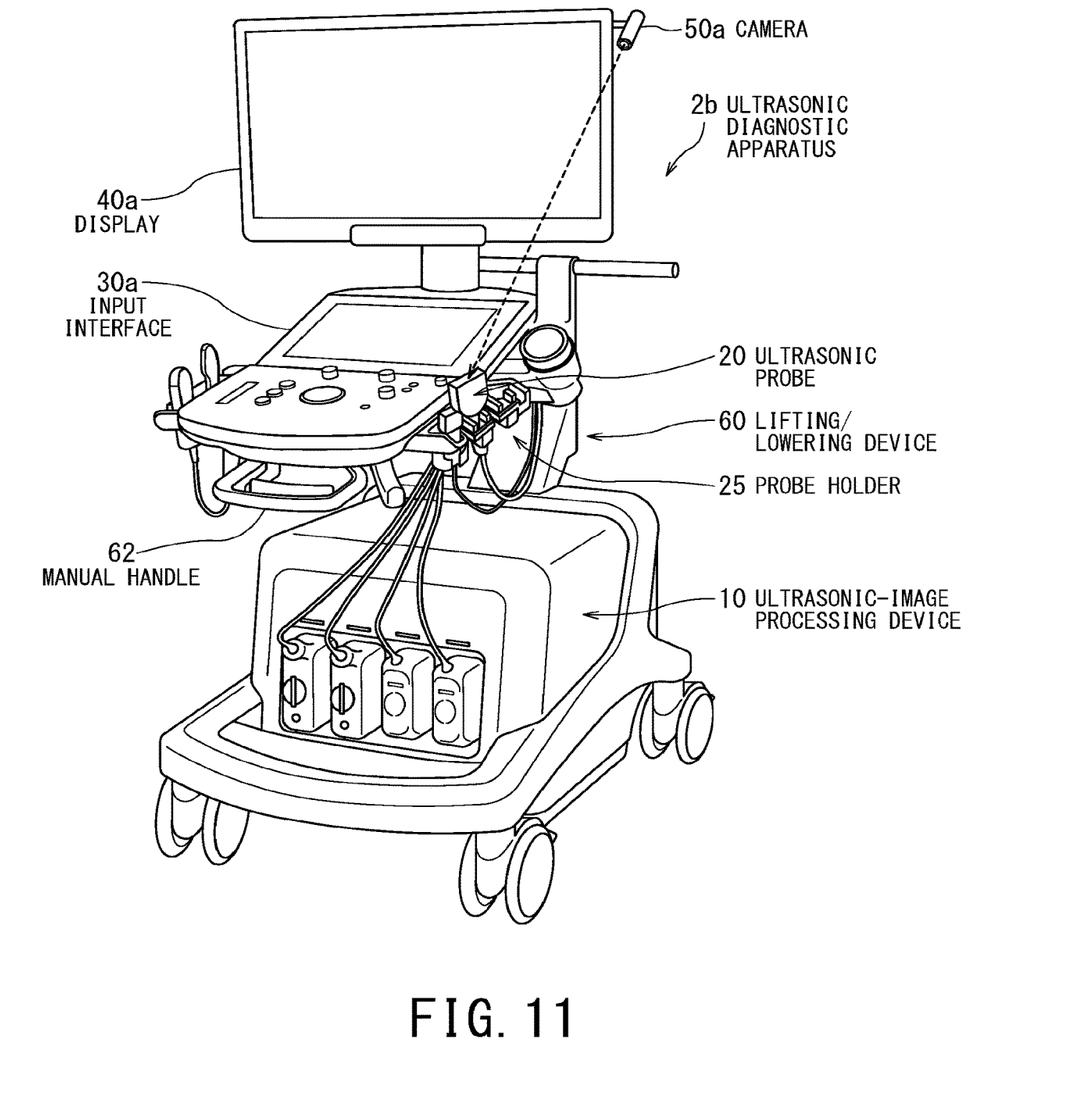
FIG. 11 is a perspective view illustrating appearance of the ultrasonic diagnostic apparatus according to the fourth embodiment.

The fourth embodiment shows a configuration in which the camera images the contact surface of the ultrasonic probe held by a probe holder.

FIG. 11 is a perspective view illustrating appearance of the ultrasonic diagnostic apparatus 2b according to the fourth embodiment. As shown in FIG. 11, the ultrasonic diagnostic apparatus 2b includes: the ultrasonic-image processing device 10 that is the main body; a lifting/lowering device 60; the input interface 30a; and the display 40a.

The ultrasonic-image processing device 10 generates ultrasonic image data from ultrasonic signals acquired by the ultrasonic probe 20. In addition, the ultrasonic-image processing device 10 causes the display 40a to display the ultrasonic image based on the generated ultrasonic image data and stores the ultrasonic image inside the ultrasonic-image processing device 10.

The lifting/lowering device 60 supports the input interface 30a and the display 40a such that they can be lifted and lowered in both manual and motorized (or electric) operation modes.

The manual handle 62 is fixed to the bottom surface of the input interface 30a and is operated in the manual operation mode, for example.

The probe holder 25 can hold the ultrasonic probe 20. The probe holder 25 is one example of a holder.

The installation position and orientation of the camera 50a are set in such a manner that the camera 50a can image the contact surface of the ultrasonic probe 20 held by the probe holder 25. That is, the camera 50a is attached to the upper right side of the display 40a and faces the contact surface of the ultrasonic probe 20 which is disposed obliquely downward. Since the camera 50a is dedicated to the contact-surface determination, the position and orientation of the camera 50a are fixed. In addition, the probe holder 25 is installed in a manner that the contact surface of the ultrasonic probe 20 held by the probe holder 25 faces the camera 50a.

If the camera 50a is not dedicated to the contact surface determination but is also used for other purposes, the camera 50a may be moved or rotated so as to face the contact surface of the ultrasonic probe 20 when the user sets the ultrasonic probe 20 in the probe holder 25. In addition, the probe holder 25 may be rotated so that the contact surface of the ultrasonic probe 20 held by the probe holder 25 faces the camera 50a. Afterward, in the superimposed image where the frame line is superimposed on the optical image generated by the camera 50a, at least one of the orientation of the camera 50a and the orientation of the probe holder 25 may be adjusted so that the contact surface of the ultrasonic probe 20 is placed within the frame line. Note that as long as the contact surface of the ultrasonic probe 20 can be imaged, the frame line is not necessary.

According to the above-described configuration, setting the ultrasonic probe 20 in the probe holder 25 enables the camera 50a to image the contact surface of the ultrasonic probe 20, and the user does not have to adjust the position and orientation of the ultrasonic probe 20.

The contact-surface determination function 157 may determine the state of the contact surface of the ultrasonic probe 20 when the user sets the ultrasonic probe 20 in the probe holder 25. When the ultrasonic probe 20 is set in the probe holder 25, it means that the ultrasonic probe 20 will be used again. By determining the state of the contact surface and solving the abnormal state before reuse, the element check of the ultrasonic probe 20 can be performed smoothly, which enables smooth reuse of the ultrasonic probe 20. In addition, the camera 50a may image the ultrasonic probe 20 while following the movement of the ultrasonic probe 20.

According to at least one embodiment described above, the state of the contact surface of the ultrasonic probe can be automatically determined.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A contact-surface determination apparatus comprising processing circuitry configured to:
   acquire an image depicting a contact surface of an ultrasonic probe; and
   determine a state of the contact surface of the ultrasonic probe based on the image, wherein the state of the contact surface of the ultrasonic probe is whether a foreign substance adheres to the contact surface of the ultrasonic probe.

2. The contact-surface determination apparatus according to claim 1, wherein the contact surface is a surface to be brought into contact with an object.

3. An ultrasonic diagnostic apparatus comprising:
   an ultrasonic probe; and
   processing circuitry configured to acquire an image depicting a contact surface of the ultrasonic probe, determine a state of the contact surface of the ultrasonic probe based on the image, and determine a state of a transducer of the ultrasonic probe when the state of the contact surface of the ultrasonic probe is normal, wherein the state of the contact surface of the ultrasonic probe is whether a foreign substance adheres to the contact surface of the ultrasonic probe.

4. The ultrasonic diagnostic apparatus according to claim 3, further comprising a display,
   wherein, when the state of the contact surface of the ultrasonic probe is not normal, the processing circuitry is configured to cause the display to display information indicating that the state of the transducer of the ultrasonic probe cannot be determined.

5. The ultrasonic diagnostic apparatus according to claim 4, wherein the processing circuitry is configured to cause the display to further display the state of the contact surface of the ultrasonic probe, when the state of the contact surface of the ultrasonic probe is not normal.

6. The ultrasonic diagnostic apparatus according to claim 5, further comprising a camera configured to generate the image by imaging the ultrasonic probe,
   wherein the processing circuitry is configured to determine the state of the contact surface of the ultrasonic probe based on the image, when the contact surface of the ultrasonic probe is within a predetermined imaging region of the camera.

7. The ultrasonic diagnostic apparatus according to claim 6, wherein the processing circuitry is configured to cause the display to perform guidance display for placing the contact surface of the ultrasonic probe within the predetermined imaging region.

8. The ultrasonic diagnostic apparatus according to claim 6, further comprising a holder configured to be able to hold the ultrasonic probe,
   wherein the camera is installed in such a manner that the camera can image the contact surface of the ultrasonic probe held by the holder.

9. An ultrasonic diagnostic system comprising:
   an ultrasonic diagnostic apparatus provided with an ultrasonic probe; and
   a contact-surface determination apparatus communicably connected to the ultrasonic diagnostic apparatus and provided with a camera, wherein the contact-surface determination apparatus comprises first processing circuitry configured to acquire an image depicting a contact surface of the ultrasonic probe, determine a state of the contact surface of the ultrasonic probe based on the image, and transmit the state information of the contact surface of the ultrasonic probe to the ultrasonic diagnostic apparatus, and wherein the ultrasonic diagnostic apparatus comprises second processing circuitry configured to receive the state information of the contact surface of the ultrasonic probe from the contact-surface determination apparatus, determine a state of a transducer of the ultrasonic probe when receiving the state of the contact surface of the ultrasonic probe, and control output of a determination result of the state of the transducer of the ultrasonic probe, wherein the state of the contact surface of the ultrasonic probe is whether a foreign substance adheres to the contact surface of the ultrasonic probe.

* * * * *